United States Patent [19]

Nagel et al.

[11] Patent Number: 5,324,341
[45] Date of Patent: Jun. 28, 1994

[54] METHOD FOR CHEMICALLY REDUCING METALS IN WASTE COMPOSITIONS

[75] Inventors: Christopher J. Nagel, Boston, Mass.; Robert D. Bach, Grosse Pointe, Mich.; James E. Johnston, Waltham, Mass.

[73] Assignee: Molten Metal Technology, Inc., Waltham, Mass.

[21] Appl. No.: 879,978

[22] Filed: May 5, 1992

[51] Int. Cl.⁵ .............................................. C21B 15/00
[52] U.S. Cl. ........................................ 75/503; 75/414
[58] Field of Search .................................. 75/503, 414

[56] References Cited

U.S. PATENT DOCUMENTS

| | | | |
|---|---|---|---|
| 2,953,445 | 9/1960 | Rummel | 48/216 |
| 3,043,681 | 7/1962 | Voy | 75/503 |
| 3,291,597 | 12/1966 | Mellgren et al. | 75/63 |
| 3,615,356 | 10/1971 | Grenfell | 75/60 |
| 3,769,002 | 10/1973 | O'Neill et al. | 75/82 |
| 4,120,698 | 10/1978 | Atchison et al. | 75/82 |
| 4,346,661 | 8/1982 | Nakamura | 110/259 |
| 4,415,358 | 11/1983 | Metz et al. | 75/58 |
| 4,469,510 | 9/1984 | Metz et al. | 75/51 |
| 4,532,113 | 7/1985 | Chao et al. | 423/138 |
| 4,831,943 | 5/1989 | Aune | 110/346 |

FOREIGN PATENT DOCUMENTS 1233013  8/1988  Canada ..................................... 23/230
0085153  10/1983  European Pat. Off.

OTHER PUBLICATIONS

Sumitomo Metal Ind., "Ferroalloy Manufacture Method Add Ore Oxide Alloy Element Iron Melt Carbonaceous Fuel Oxygen Blow." (From *Derwent Publications Ltd.*, London, GB, Week 8324, May 4, 1983, Abstract No. J58073742.).

Nippon Jiryoku Senk, "Recover Nickel Cadmium Battery Waste Charge Battery Chip Fuse Steel Recover Cadmium Vapour Nickel Alloy." (From *Derwent Publications Ltd.*, London, GB, Week 8943, Sep. 12, 1989, Abstract No. J01228586.).

Primary Examiner—Peter D. Rosenberg
Attorney, Agent, or Firm—Hamilton, Brook, Smith & Reynolds

[57] ABSTRACT

An environmentally sound process is described for the remediation of waste materials and oxides of metals that allows the separation, recovery and decontamination of metals. The method includes chemically reducing essentially all of a reducible toxic and potentially hazardous metal oxide of a metal-containing composition. A metal-containing composition is directed into a molten bath, including a first reducing agent which, under the operating conditions of the molten bath, chemically reduces a first metal oxide of a metal in the metal-containing composition to form a bath-soluble transient second metal oxide. A second reducing agent is directed into the molten bath. The second reducing agent, under the operations of the molten-bath, chemically reduces the second metal oxide, provided that the second reducing agent has a Gibbs free energy lower than that of the second metal oxide. The rate at which the second reducing agent is directed into the molten bath, relative to the rate at which the metal-oxide of the metal-containing composition is directed into the molten-bath, is sufficient to cause essentially all subsequently formed second metal oxide to dissolve in the molten bath, thereby chemically reducing essentially all of the metal oxide of the metal-containing composition. This indirect reduction technology can remediate a variety of materials, including ash metal-contaminated municipal waste, vitreous stag-like materials and spent metal catalysts, while allowing the recovery of remediable metals.

40 Claims, 1 Drawing Sheet

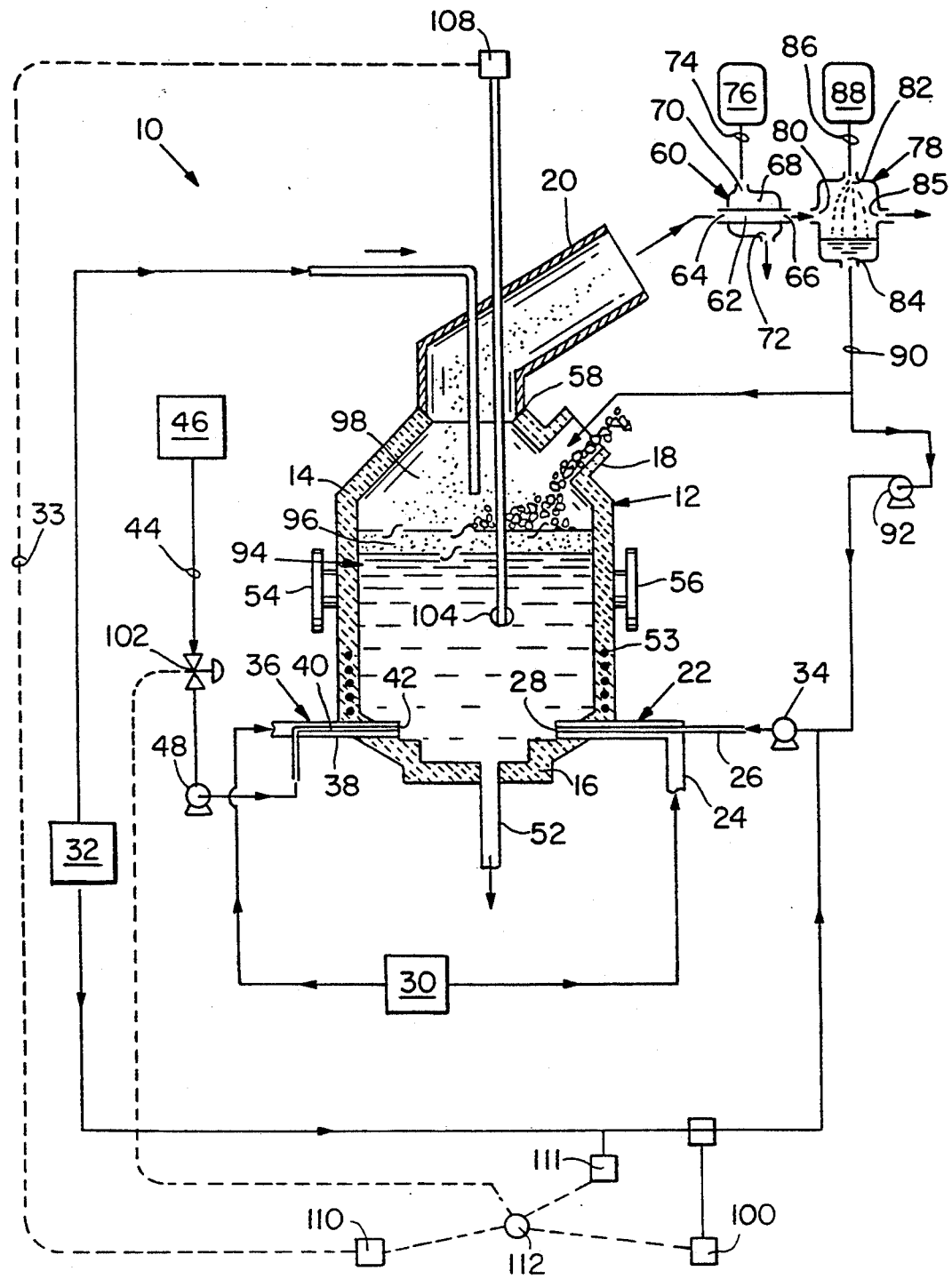

METHOD FOR CHEMICALLY REDUCING METALS IN WASTE COMPOSITIONS

BACKGROUND OF THE INVENTION

Disposal of hazardous waste is increasingly becoming a problem. The availability of suitable space for burial of such wastes is diminishing. Also, contamination of the environment by conventional methods of disposal, such as by dumping and incineration, is increasingly apparent. For example, metals, such as lead, which are often present in hazardous wastes, do not decompose. Release of hazardous wastes to the environment as gases and dust, such as fly ash, often contaminates water supplies and pollutes the atmosphere, thereby generally diminishing the quality of life in surrounding populations.

Those with heightened awareness of onsetting ecological problems are not only cognizant of the increasing problems of waste disposal but also of the impending hazards associated with the large volume of residual materials generated by the incineration of all forms of waste. Incineration generally results in incomplete combustion due to inefficient combination with oxygen and the presence of noncombustible inorganic salts and metals. This typically affords a residue in excess of twenty five percent of the initial mass of the waste material and often in excess of seventy percent. Since a mass balance must be maintained, except for the loss of mass due to water, nitrogen and related gases, the combination of carbonaceous materials with oxygen affording carbon dioxide actually increases the mass of off-gases by a factor of about three. Although the overall process achieves a desirable volume and mass reduction, the concentration of noncombustible toxic material is necessarily increased and is often contained within a leachable ash residue. Fly ash also continues to pose a more recognizable hazard since, as noted above, land-filling is being deemphasized as a viable disposal method. Attempts to reduce the volume of residue by more complete combustion is associated with an economic penalty due to post-combustion stages and the need for excess auxiliary fuels. Despite these efforts, the lower flame temperature indigenous to classical incineration methodologies combined with the associated temperature of their residuals are features that still assure that generic ash is typically below its fusion point and unvitrified. Such unvitrified residues are commonly leachable in nature and constitute an environmental hazard since the toxic constituents are now in a more concentrated form and may readily enter the ecosystem.

In addition, hazardous waste streams, such as fly ash produced by oil-fired thermal generating power stations, include valuable metals, such as nickel and vanadium. Attempts to recover such metals from fly ash have included, for example, smelting of fly ash in an arc flash reactor. However, chemical reduction of metal oxides in an arc flash reactor is generally incomplete. Further, other components of a metal-containing composition, such as hazardous waste-containing organic components, can release hazardous organic materials, such as dioxins, to the atmosphere during processing in an arc flash reactor.

Direct metal reduction technology involves directing a reducing agent, such as carbon, through the molten bath to thereby chemically reduce metal oxides. The overall objective is to selectively reduce oxides contained in ore as rapidly as possible to reduce production costs. The reducing agent, typically, is injected into, or more commonly onto, a molten bath at a rate and in an amount sufficient to react with metal oxides which are not dissolved in the molten bath. Reactions carried out under such heterogeneous conditions are highly inefficient because of a relatively low collision frequency of reactant molecules and cannot ensure a chemically remediated reduced species for recovery. Consequently, the amount of reducing agent which is introduced to the molten bath typically is significantly in excess of the theoretical amount required to chemically reduce the metal oxide. The rate at which the reducing agent is introduced to the molten bath is often sufficient to entrain metal oxides before they can dissolve in the molten bath for reduction therein. Such entrainment further diminishes chemical remediation of the remediable species.

Therefore, a need exists for a method that reduces and chemically remediates a metal oxide contaminant of a metal-containing composition in an ecologically sound manner which overcomes or minimizes the above-mentioned problems.

SUMMARY OF THE INVENTION

The present invention relates to a method for indirect chemical reduction of an oxygen-containing metal compound of a metal-containing waste composition.

The method includes directing a metal-containing waste composition into a molten bath, including a first reducing agent which, under the operating conditions of the molten bath, chemically reduces the oxygen-containing metal compound in the metal-containing waste composition to form a metal oxide. A second reducing agent, which, under the operating conditions of the molten bath, chemically reduces the metal oxide, is directed into the molten bath at a rate, relative to the rate at which the metal of the oxygen-containing metal compound is directed into the molten bath, sufficient to cause essentially all subsequently formed metal oxide to dissolve in the molten bath, thereby indirectly chemically reducing the oxygen-containing metal compound of the metal-containing waste composition.

The oxidation state of an oxygen-containing metal compound, such as a metal oxide, can be altered in a reductive manner by its interaction with a metal that has a lower free energy of oxidation. The metal-containing waste composition includes an oxygen-containing metal compound having the empirical formula, $M^1O_xL_n$, where "M" is a metal "0" is oxygen where "x" is equal to or greater than 1, and "L" is a ligand (organic or inorganic) where "n" is equal to or greater than zero. In this oxygen exchange process, a metal oxide $M^1O_x$, where x provides a sufficient number of oxygen atoms to naturally satisfy the valency of the metals, is reduced to its metallic state by another metal, $M^2$, which is also called a first reducing agent, having a lower free energy of oxidation, to thereby form a second metal oxide of greater thermodynamic stability. The second metal oxide is subsequently reduced by controlled addition of a second reducing agent—such as carbon, to form carbon monoxide—providing that carbon monoxide has a lower Gibbs free energy of oxidation than the second metal oxide. The overall chemical reaction can be represented as follows:

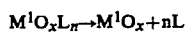

$$M^1O_xL_n \rightarrow M^1O_x + nL$$

$$M^1O_x + M^2 \rightarrow M^2O_x + M^1 \rightarrow xCO + M^1 + M^2.$$

Reduction of the second metal oxide completes a cycle by returning the second metal oxide to its elemental state, thereby making the metal available for subsequent reduction of additional metal oxide directed into the molten bath. The solvation of aggregate $M^1O_x$ into a bath metal ($M^2$) decreases the activation energy required to transfer the oxygen from $M^1O_2$ to $M^2$, forming $M^2O_x$ and thereby enhances the rate of transfer over heterogeneous chemical processes.

The reduction is "indirect" in that the first metal oxide is reduced by reaction with a first reducing agent metal to form a second metal oxide. The second metal oxide is an intermediate which is, in turn, reduced by reaction with a second reducing agent, which restores the first reducing agent. The first reducing agent is thereby available for continued reduction of additional first metal oxide. Thus, the steady state concentration of the first metal oxide is controlled, at least in part, by the rate of introduction of the second reducing agent. The first metal oxide is thereby indirectly chemically reduced by introduction of the second reducing agent.

Little attention is given to the completeness of the reduction step in direct ore reduction when it is being carried out in a production mode since the overall time period required for a given heat cycle is of the essence. However, in the present case complete and controllable reduction is not only desirable but it is necessary to an environmentally viable technology. Only in this highly controlled manner can the environmental integrity of the overall detoxification of a metal oxide contaminant be achieved with the required completeness while prohibiting the escape of toxic metal contaminants to the environment. It is within this context that the indirect reduction methodology achieves complete reduction and detoxification of oxygen-containing metal compounds.

In typical rapid direct ore reduction the metal oxides are dispersed through the entire bath in a heterogeneous manner by the turbulence of mixing. A distinct advantage of the present indirect reduction technology, involving a discrete intermediate, is that rapid and effective and controllable migration of the second metal oxide, $M^2O_x$, away from the point of injection is achieved, in this bath of relatively low viscosity, by a highly efficient thermoneutral identity reaction involving oxygen atom transfer from the initially formed transient metal oxide (e.g. Fe*O) to the bath metal (Eq. 2). Since the migratory process is rapid $$Fe^*O + Fe \rightarrow Fe^* + FeO \quad (Eq. 2)$$

under the conditions of the bath, oxygen transfer should occur on every collision and the second metal oxide can rapidly migrate from its point of inception to intercept the second reducing agent and be reduced in a highly predictable manner that is thermodynamically controlled. Other advantages of this indirect metal oxide reduction process are delineated below.

Reducible metals of metal oxide components in the waste are thereby completely separated from the waste composition and are converted to their elemental state for subsequent recovery. For example, when iron is employed as the molten solvent, a transient metal oxide can be derived from the bath metal. A dynamic iron-(II)oxide (Fe*O) balance can be maintained in the bath by the controlled addition of remediable metal oxides.

The introduction of carbon in approximately stoichiometric quantities, with respect to oxygen, results in the formation of elemental metal and the liberation of energy attending the oxidation of carbon to form carbon monoxide.

In general, metal oxides in their higher oxidation state tend to have a greater solubility in the more polar orionic vitreous phase than in the metal bath. When the bath metal is common to that of an oxide of that metal in its higher oxidation state, thermodynamics ensures disproportionation of the metal oxide to a lower oxidation state. An increase in the ratio of metal to oxygen is attended by a decrease in Gibbs free energy, normalized to oxygen, and consequently a greater solubility of the partially reduced metal oxide in the metal bath. For example, iron(III)oxide ($Fe_2O_3$) is essentially insoluble in an iron bath but its dissolution is readily achieved by disproportionation with iron to form iron(II)oxide (FeO). This basic concept renders oxides of other metals in their higher oxidation states to also be solubilized in an iron bath upon reduction.

In this mode of the invention two discrete and highly chemoselective metal reduction steps are preferred each involving one or both metal oxides dissolved in the metal bath. It is under these operating conditions that this indirect reduction process involving a discrete intermediate, operates most efficiently and has its greatest environmental impact. The intermediacy of a soluble metal oxide ($M^2O_x$) derived from the bath metal, and its subsequent reduction in a second discrete step can be achieved by introducing two independent reactant streams sufficiently remote from one another to assure reduction of the first oxide ($M^1O_x$) prior to its collision with the second reducing agent (e.g. carbon).

In the first reduction step, the short-lived intermediate metal oxide ($M^2O_x$) is formed within the localized vicinity of a tuyere. The oxygen transfer from ($M^1O_x$) to the bath metal is controlled by turbulent mixing and the position of equilibrium is determined by the difference in free energy between $M^1O_x$ and $M^2O_x$. The rate of introduction of $M^1O_x$ is moderated in a manner such that the molarity of the second metal oxide ($[M^2O_x]$) does not exceed its solubility in the bath metal ($M^2$). If the [$M^2O$]/[$M^2$] ratio rises above that of the saturation limit, the second metal oxide can potentially migrate to a vitreous phase and then be subject to the less efficient reducing environment which is typically characteristic of a heterogeneous milieu.

The second reducing agent is typically introduced through a tuyere or lance and may be effectively dissolved in the bath by complexation with the metal. This is especially true in the case of carbon in an iron bath, where the solubility of carbon is much higher than the effective concentration of iron carbide that will be required at a steady-state reduction of $M^2O_x$.

The ratio of second reducing agent (e.g. carbon) to incipient oxide $M^2O_x$ should be maintained at about 1:1 such that the second reduction step, of forming an oxide (e.g. CO) and regenerating the bath metal, can ensue at the point of intersection of two reaction zones, where one zone is disposed at each of two remotely located tuyeres. It is emphasized that the two reaction zones need not intersect but may be further separated or sidewall injected. Reaction of the transient metal oxide with the reducing agent in their dissolved states is an extremely rapid thermodynamically driven reaction. The molar ratio of active bath metal ($[M^2]$) to the carbon concentration ($[C]$) is sufficiently high under typical operating conditions, such that the $M^1O_x$ will be reduced by the bath metal. It is desirable, but not essential, that the second reduction step occur before $M^2O_x$ can migrate to the vitreous layer. When the contiguous reduction steps are carried out in solution as completely dissolved species, quantitative detoxification of the metal oxide contaminants is assured.

In the treatment of highly toxic metals it is especially important that the quantity of metal vapors and metal oxides released to the atmosphere be well below EPA standards. Thus, the reduction must be complete and the amount of off gas that is a byproduct of the process should be minimized. The reclamation of cadmium metal from its oxide is a case in point.

In accordance with the invention, CdO is treated as a toxic contaminant in a waste stream in an iron bath, with dissolved iron(II)oxide (FeO) and carbon as a second reducing agent, to produce dissolved cadmium metal (Cd) which may subsequently be recovered. This reaction is represented as follows:

$$CdO + Fe \rightarrow (FeO) + Cd \rightarrow Fe + Cd + CO \uparrow$$

$$\text{Overall: } CdO + C \rightarrow Cd + CO \uparrow$$

The overall net reaction may also be achieved by direct reduction by carbon. However, as discussed above, direct reduction of cadmium metal would not be as environmentally prudent as the preferred reduction-extraction method wherein the reactive intermediate is solubilized prior to the key reduction step since only the latter can guarantee remediation.

This method also provides a pathway for metal oxides occluded in vitreous materials to be reduced at the metal surface, and the more soluble, partially reduced or fully reduced elemental metal, can be transferred to the metal phase where it can subsequently be chemically remediated and recovered. In a similar manner, this partitioning of an insoluble, or partially insoluble, metal oxide between a polar inorganic phase, comprised largely of oxides of metals, and a metal phase, can be applied to the chemical remediation, purification, and recovery of valuable metals from such vitreous or polar inorganic metal-bearing materials. Thus, finely divided polar materials can be injected into the metal bath, as described below, at a rate that would allow a surface reaction of this heterogeneous dispersion to nominally extract precious or recoverable metals into the metal phase. Conversely, readily reducible volatile metals such as Cd, Hg and Zn will distill from the bath subsequent to their reduction-extraction, affecting both separation and decontamination of these toxic metals. Metal recovery from injected particles of lesser density than that of the bath metals, as they rise to the surface, many continue at the metal-vitreous phase interface.

This invention has many other advantages. For example, essentially all of the subsequently formed second metal oxide is dissolved in the molten metal bath. The second metal oxide mixes with the second reducing agent as a solute in the molten bath, thereby increasing the efficacy of particle collision and the efficiency of heat transfer in the molten bath. Under these conditions, the reduction step is under thermodynamic control and is therefore highly efficient, and the rate of oxygen atom transfer is a function of diffusion control and turbulent mixing. Consequently, the reaction yield of the second metal oxide reduction is significantly increased relative to high volume production methods which indiscriminately blow carbon onto a molten bath. Another distinct advantage of reduction of the second metal oxide in its dissolved state is that only near-stoichiometric amounts of carbon are required, which reduces the impact of $CO_2$ emissions on the greenhouse effect relative to less efficient methods. Hence, the amount of $CO_2$ and other off-gases, released from the molten bath and consequent demand for off-gas treatment are hereby reduced substantially by the method of the invention. Most importantly, the volume of highly toxic metals, such as cadmium, zinc, mercury and arsenic, and chemically contaminated ash, sludge, dust, etc. that are either emitted to the atmosphere or landfilled, are reduced substantially by the method of the invention because it affords a means for separating, chemically remediating, purifying, and recovering commercial products from contaminated substances.

BRIEF DESCRIPTION OF THE DRAWING

The figure is schematic representation of a system for conducting the method of the invention.

DETAILED DESCRIPTION OF THE INVENTION

The features and other details of the method of the invention will now be more particularly described with reference to the accompanying figure and pointed out in the claims. It will be understood that particular embodiments of the invention are shown by way of illustration and not as limitations of the invention. The principal features of this invention can be employed in various embodiments without departing from the scope of the invention.

The present invention generally relates to a method for recovering metal from a metal-containing waste composition, by chemically reducing a metal oxide of a metal-composition. Bach et al., U.S. Pat. Nos. 4,754,714 and 4,602,574, disclose a molten metal bath, such as is used in a steelmaking facility, which destroys polychlorinated biphenyls and other organic wastes, optionally together with inorganic wastes. Nagel, U.S. patent application Ser. No. 07/557,561, filed Jul. 24, 1990, discloses a method and system for forming carbon dioxide from carbon-containing materials in a molten bath of immiscible metals. Nagel, U.S. patent application Ser. No. 07/737,048, filed Jul. 29, 1991, discloses a method and system for controlling chemical reaction in a molten bath. Nagel et al., U.S. patent application Ser. No. 07/737,199, filed Jul. 29, 1991, discloses a method and system of formation of oxides of dissolved atomic constituents in a molten bath. Nagel et al., U.S. patent application Ser. No. 07/788,804, filed Nov. 7, 1991, discloses a method and system for reducing the volume of radioactive compositions. The teachings of U.S. Pat. Nos. 4,754,714 and 4,602,574, and of U.S. patent applications Ser. Nos. 07/557,561, 07/737,048, 07/737,199 and 07/788,804, are incorporated herein by reference.

System 10, illustrated in the figure, is one embodiment Of a system suitable for practicing the method of the invention. System 10 includes reactor 12. Examples of suitable vessels include K-BOP, Q-BOP, argon-oxygen decarbonization furnaces (AOD), EAF, etc., such as are known in the art of steelmaking. Reactor 12 has an upper portion 14 and a lower portion 16. Feed inlet 18 at upper portion 14 of reactor 12 is suitable for directing feed into reactor 12. Off-gas outlet 20 extends from upper portion 14 and is suitable for conducting an off-gas out of reactor 12.

Feed tuyere 22 is disposed at lower portion 16 of reactor 12 and includes shroud gas tube 24 and feed inlet tube 26. Feed tuyere 22 defines feed tuyere opening 28 at lower portion 16 of reactor 12. Shroud gas tube 24 extends from shroud gas source 30 to feed tuyere opening 28 at reactor 12. Feed inlet tube 26 extends from feed source 32 to feed tuyere opening 28 at reactor 12. Feed inlet tube 26 is disposed within shroud gas tube 24 at feed tuyere opening 28. Pump 34 is disposed at feed inlet tube 26 to direct a suitable feed from feed source 32 through feed tuyere opening 28 into reactor 12.

Feed tuyere 22 is dimensioned and configured for continuously introducing a suitable metal-containing waste composition into reactor 12. It is to be understood, however, that the metal oxide-containing composition can be introduced to reactor 12 intermittently, rather than continuously. It is also to be understood that more than one feed tuyere can be disposed in reactor 12. Further, it is to be understood that feed can be introduced into reactor 12 by directing feed through from feed source 32 through conduit 33 into reactor 12, through feed inlet 18, or by other suitable methods, such as by employing a consumable lance, etc.

Reducing agent tuyere 36 is disposed at lower portion 16 of reactor 12 at a location remote from feed tuyere 22. Feed tuyere 22 is sufficiently remote from reducing agent tuyere 36 to allow essentially all of a first metal oxide which is directed into reactor 12 to be reduced by a first reducing agent in a molten bath disposed in reactor 12 under the operating conditions of system 10.

Reducing agent tuyere 36 includes shroud gas tube 38 and reducing agent inlet tube 40. Reducing agent tuyere defines reducing agent tuyere opening 42. Reducing agent inlet tube 40 is disposed within shroud gas tube 38 at reducing agent tuyere opening 42. It is to be understood that more than one reducing agent tuyere can be disposed at reactor 12. Also, it is to be understood that reducing agent tuyere 36 can be dimensioned and configured for either continuous or intermittent introduction of a reducing agent into a molten bath in reactor 12.

Shroud gas tube 38 extends from shroud gas source 30 to reducing agent tuyere opening 42. Reducing agent inlet tube 40 extends from conduit 44 to lower portion 16 of reactor 12. Conduit 44 extends from reducing agent source 46 to reducing agent inlet tube 40. Pump 48 is disposed at conduit 44 for directing a suitable second reducing agent from reducing agent source 46 through conduit 44 and reducing agent inlet tube 40 into reactor 12.

Bottom-tapping spout 52 extends from lower portion 16 and is suitable for removal of at least a portion of a molten bath from reactor 12. Additional bottom-tapping spouts, not shown, can be provided as a means of continuously or intermittently removing at least a portion of a molten bath from reactor 12. Material can also be removed by other means, such as are known in the art of steelmaking. For example, material can be removed from reactor 12 by rotating reactor 12 and employing a launder, not shown, extending from feed inlet 18. Alternatively, the launder can extend into reactor 12 through a tap-hole, not shown.

Induction coil 53 is disposed at lower portion 16 for heating a molten bath within reactor 12 or for initiating generation of heat within reactor 12. It is to be understood that, alternatively, reactor 12 can be heated by other suitable means, such as by oxyfuel burners, electric arc, etc. Trunions 54,56 are disposed at reactor 12 for manipulation of reactor 12. Seal 58 is disposed between reactor 12 and off-gas outlet 20 and is suitable for allowing partial rotation of reactor 12 about trunions 54,56 without breaking seal 58. Alternatively, reactor 12 does not include trunions 54,56 or seal 58 and does not rotate.

Heat exchanger 60 is disposed at off-gas outlet 20. Heat exchanger 60 can be any suitable heat exchanger for cooling off-gas discharged from reactor 12. Examples of suitable heat exchangers include water-cooled hoods, shell-and-tube heat exchangers, etc. In one embodiment, heat exchanger 60 is a shell-and-tube heat exchanger which includes off-gas side 62 defining off-gas inlet 64 and off-gas outlet 66. Heat exchanger 60 also includes coolant side 68 which defines coolant inlet 70 and coolant outlet 72. Conduit 74 extends between coolant source 76 and coolant inlet 70 of heat exchanger 60. A coolant which is suitable for cooling off-gas is disposed at coolant source 76. Examples of suitable cooling media include, for example, water, ethylene glycol, ethylbenzene, alcohols, etc.

Scrubber 78 is disposed at off-gas outlet 66 of heat exchanger 60. Scrubber 78 is suitable for removing a component of the off-gas to form a stream which can be directed into reactor 12 or disposed of by some other suitable means. An example of a suitable scrubber is a caustic-type scrubber. Scrubber 78 defines off-gas inlet 80, scrubber fluid inlet 82, scrubber fluid outlet 84 and off-gas outlet 85. Conduit 86 extends between scrubber fluid source 88 and scrubber fluid inlet 82 of scrubber 78. A scrubber fluid which is suitable for separating at least one component of off-gas from the off-gas is disposed at scrubber fluid source 88. Examples of suitable scrubber fluids include sodium hydroxide (NaOH), calcium hydroxide ($Ca(OH)_2$), etc.

Conduit 90 extends from scrubber outlet 84 to feed inlet 18 of reactor 12 and to feed inlet tube 26 of feed tuyere 22. Pump 92 is disposed at conduit 90 for directing scrubber fluid from scrubber 78 to reactor 12.

A reaction zone within system 10 includes molten bath 94, vitreous layer 96 and gaseous phase 98. In one embodiment, molten bath 94 includes a first reducing agent, such as a metal component. The first reducing agent can chemically reduce a metal oxide component of a metal oxide-containing composition directed into molten bath 94 because the oxide of the first reducing agent has a lower Gibbs free energy of formation than the metal oxide component. Alternatively, a first reducing agent can be directed into molten bath 94 during chemical reduction of a first metal oxide in molten bath 94 according to the method of the present invention.

Examples of suitable first reducing agents, which are metal components of molten bath 94, include iron, chromium, manganese, copper, nickel, cobalt, etc. It is to be understood that molten bath 94 can include more than one metal. For example, molten bath 94 can include a solution or alloy of metals. Also, it is to be understood that molten bath 94 can include oxides of the molten bath metals. As disclosed in U.S. patent application Ser. No. 07/557,561, molten bath 94 can include more than one phase of molten metal. In one embodiment, molten bath 94 includes at least one metal oxide or at least one salt.

In one embodiment, molten bath 94 is formed by at least partially filling reactor 12 with a metal. The metal is then heated to form molten bath 94 by activating induction coil 53 or by other means, not shown. Where a molten bath having immiscible phases is to be formed, two immiscible metals are introduced to reactor 12. The metals separate during melting to form a first molten metal phase and a second molten metal phase, which is immiscible in first molten metal phase.

Vitreous layer 96 is disposed on molten bath 94. Vitreous layer 96 is substantially immiscible with molten bath 94 and typically includes at least one metal oxide. Alternatively, system 10 does not include vitreous layer 96. Typically, vitreous layer 96 has a low viscosity, allowing volatile free radicals and gases to pass from molten bath 94 through vitreous layer 96 and into gaseous phase 98. In one embodiment, vitreous layer 96 has a lower thermal conductivity than that of molten bath 94. Radiant loss of heat from molten bath 94 can thereby be reduced to significantly below the radiant heat loss for molten bath 94 in the absence of a vitreous layer. It is to be understood that vitreous layer 96 can include more than one metal oxide. Vitreous layer 96 can also include more than one phase.

Vitreous layer 96 can be formed by directing suitable materials into reactor 12 and then heating the materials in reactor 12 to a sufficient temperature to melt the materials. Vitreous layer 96 can also comprise slag or sludge contaminated with toxic metals or other valuable metals or their oxides that are suitable for reclamation. The materials can be directed onto the top of molten bath 94 or injected into molten bath 94, using methods such as are well known in the art of steelmaking. Examples of suitable materials for forming vitreous layer 96 include metal oxides, halogens, sulfur, phosphorous, heavy metals, sludges, etc. Examples of suitable metal oxides of vitreous layer 96 include titanium oxide ($TiO_2$), zirconium oxide ($ZrO_2$), aluminum oxide ($Al_2O_3$), magnesium oxide (MgO), calcium oxide (CaO), silica ($SiO_2$), etc. Components of the feed can also be included in vitreous layer 96. In one embodiment, vitreous layer 96 contains about 40% calcium oxide, about 40% silicon dioxide and about 20% aluminum oxide, and is about five inches thick in a quiescent state.

The materials employed to form vitreous layer 96 can become Components of vitreous layer 96 by forming other stable compounds by chemical reaction, for example, with alkaline metal cations and alkaline earth metal cations. Examples of such reaction products include calcium fluoride ($CaF_2$) and magnesium phosphate ($Mg_3(PO_4)_2$). Additional examples include calcium sulfide and glasses containing volatile metal oxides, such as lead oxide.

Gaseous layer 98 extends from vitreous layer 96 at upper portion 14 of reactor 12 through off-gas outlet 20 to scrubber 78. Gaseous layer 98 includes off-gas formed in molten bath 94 and in vitreous layer 96. Off-gas is at least partially formed by volatilization and reaction of components of the feed to form gases, such as carbon monoxide and, optionally, carbon dioxide.

A metal-containing waste composition is directed, as a feed, from feed source 32, into reactor 12. Examples of suitable metal-containing waste compositions include metal-contaminated sludge, ash, dust and soil. Examples of suitable oxygen-containing metal compounds include metal oxides, metal hydroxides, metal oxyhalides, metal alkoxides, oxides of heavy metals such as, for example, Pu and U, that may be radioactive and oxides of precious metals. It is to be understood, however, the metal-containing composition can include more than one oxygen-containing metal compound. Examples of suitable heavy metals of the oxygen-containing metal compounds include lead, mercury, cadmium, zinc, tin, and arsenic. Examples of suitable precious metals of the oxygen-containing metal compounds include titanium, vanadium, niobium, chromium, cobalt, nickel, silver, and platinum. Examples of other suitable metals include copper and iron. Specific examples of suitable oxygen-containing metal compounds include $FeO$, $Fe(OH)_2$, $VOCl$, and $Ni(OC_2H_5)$.

In one embodiment, the metal-containing waste composition includes a first metal oxide which can be reduced by a first reducing agent in molten bath to form a second metal oxide. Also, it is to be understood that the metal-containing composition can include a metal which is oxidized, according to one embodiment of the method of the present invention, in molten bath to form the first metal oxide. Optionally, the metal-containing waste composition can include organic components. Organic components of the metal-containing waste composition are dissociated in the molten bath to their atomic constituents. The initial thermal exposure of organic compounds to the operating environment of the reaction zone induces bond rupture or fragmentation that transforms the substances into a more oxidizable (open shell) form. Examples of suitable metal-containing compositions include mixed waste containing copper oxide and various polymeric materials resulting from printed circuit board production, mixed waste containing nickel ligands and various organic constituents, and vanadium and/or molybdenum catalysts used in the epoxidation of alkenes.

Feed is directed from feed source 32 through feed inlet tube 26 into molten bath 94 conjointly with a shroud gas, which is directed from shroud gas source 30 through shroud gas tube 24. The shroud gas directed into molten bath 94 through feed tuyere 22 is suitable for cooling a region within molten bath 94 proximate to feed tuyere 22 under the operating conditions of system 10. Examples of suitable shroud gases include nitrogen gas ($N_2$), steam, methane ($CH_4$), chlorobenzene ($C_6H_5Cl$), etc. In one embodiment, chlorobenzene is converted by exposure to molten bath 94 to form hydrocarbon-fragment radicals and chlorine radicals.

It is to be understood that the metal-containing waste composition can be introduced anywhere within the reaction zone which is sufficiently remote from the location in the reaction zone at which a second reducing agent is directed into molten bath 94. For example, the metal-containing composition can be directed into reactor 12 through feed inlet 18 as whole articles.

Suitable operating conditions of system 10 include a temperature of molten bath 94 which is sufficient to cause a first reducing agent in molten bath 94 to chemically reduce a metal oxide component of the feed directed into molten bath 94 and thereby for a second metal oxide. Further, the temperature of molten bath 94 is sufficient to cause a second reducing agent, directed into molten bath 94, to chemically reduce the second metal oxide at a rate sufficient to cause essentially all subsequently formed second metal oxide to dissolve in molten bath 94. The first reducing agent has a Gibbs free energy of oxidation which is less than that of the metal component of the first metal oxide. In one embodiment, the stoichiometric ratio of the metal oxide to the first oxidizing agent is greater than about 1:1.

The feed directed into reactor 12 combines with molten bath 94 and can also combine with vitreous layer 96. Contact of the feed with molten bath 94 or vitreous layer 96 exposes the feed to conditions sufficient to cause a first metal oxide of the metal-containing composition to be chemically reduced by a first reducing agent in molten bath 94 and thereby form a second metal oxide. In one embodiment, the first reducing agent is a component of molten bath 94. For example, the first reducing agent can be elemental iron in a molten iron bath, wherein the molten metal bath is an "active bath." The stoichiometric ratio for the bath metal to the first metal oxide increases the propensity for FeO formation. In this mode of operation, a second reducing agent (e.g. carbon) is typically utilized and the oxygen derived from $M_1O_xL_n$ leaves the bath in the form of a volatile oxide (e.g. carbon monoxide).

Alternatively, the first reducing agent can be directed into molten bath 94 by a suitable means, such as through a tuyere, not shown. In this alternative embodiment, the molten metal bath does not react with the first metal oxide and, therefore, is a "passive bath." If another metal is included in the bath that has a lower Gibbs free energy than that of the bath metal, then all of the oxygen introduced by the first metal oxide ($M_1O_xL_n$) will be transferred to the more reactive metal. In this alternate mode of operation, a metal is employed to sequester the oxygen derived from $M_1O_xL_n$ in the form of a thermodynamically stable, nontoxic metal oxide that will not be released to the atmosphere but rather it will remain in the reactor and be ultimately removed as part of the vitreous layer. This embodiment is exemplified in more detail elsewhere. In either embodiment, essentially all of the second metal oxide dissolves in molten bath 94.

Dissolved second metal oxide migrates through molten bath 94 from a portion of molten bath 94 proximate to a portion of molten bath 94 proximate to reducing agent tuyere 36. The dissolved second metal oxide can also migrate by a suitable means, such as by agitation of molten bath 94 or by diffusion. Molten bath 94 can be agitated by a suitable means, such as by introduction of the shroud gas or by directing the metal-containing composition or the second reducing agent into molten bath 94 at a rate which is sufficient to cause turbulent flow in molten bath 94.

The second reducing agent is directed by pump 48 from reducing agent source 46 through conduit 44 and reducing agent inlet tube 40 and reducing agent tuyere 36 into molten bath 94. The second reducing agent dissolves in the bath and is suitable for chemically reducing the second metal oxide in the reaction zone, thereby chemically reducing essentially all of the metal oxide of a metal in the metal-containing composition which is directed into molten bath 94. In one embodiment, the stoichiometric ratio of the second reducing agent to the first metal oxide is greater than about 1:1. Also, the rate of reaction between the second metal oxide and the second reducing agent is sufficient to allow essentially all subsequently formed second metal oxide to dissolve in molten bath 94. An example of a suitable second reducing agent is carbon. Examples of other suitable second reducing agents include boron, silicon, ferrosilicone, etc.

The rate at which the second reducing agent is directed into molten bath 94 is sufficient, relative to the rate at which the metal component of the first metal oxide is directed into molten bath 94, to chemically reduce the second metal oxide at a rate which allows essentially all subsequently formed second metal oxide to dissolve in molten bath 94, thereby chemically reducing the first metal oxide of a metal in the metal-containing composition which is directed into molten bath 94. Further, the rate at which the second reducing agent is directed into molten bath 94 is sufficient to maintain a steady-state concentration of dissolved second metal oxide (e.g., FeO) in the bath. Also, reactor 12 need not be airtight. In one embodiment, the principle source of oxygen is the first metal oxide.

In another embodiment of this invention, a metal-containing composition includes, in addition to an oxygen-containing metal component which can be reduced by a first reducing agent, a second oxygen-containing metal compound, which is not reducible under the conditions of the molten bath by either the first reducing agent or the second reducing agent. In this embodiment, a sacrificial metal can be directed into the molten bath after the second reducing agent has reduced the second metal oxide. The sacrificial metal has a free energy of oxidation which is lower than the second reducing agent and is directed into the molten bath in an amount which is sufficient to reduce at least a substantial portion of the second oxygen-containing metal compound. The sacrificial metal is selected to have lower free energy of oxidation than both the first metal and the bath metal, so that in sequence the second metal oxide is reduced to the metallic state by the sacrificial metal. It may also be selected to have at least partial solubility in the molten bath. In this respect, the sacrificial metal is utilized as the first reducing agent and the bath remains "passive".

The introduction of the sacrificial metal, having a change in the free energy of oxidation which is lower than that of that needed to convert the remediable metal(s) containing oxides of the waste composition to their respective metals under the conditions of the bath, results in the formation of single non-volatile metals in a unitary process. Since most metals will have a higher free energy of oxidation than does the selected sacrificial metal, such as magnesium, for example, these series of in situ oxygen atom transfers between the two metals provide a means of recovering metals in their uncontaminated state from a variety of highly toxic metal oxides attending the formation of an innocuous metal oxide, such as magnesium oxide.

The correlation of the rate of introducing the second reducing agent into the molten bath with respect to the rate at which the oxygen-containing metal compound is directed into the molten bath, as aforementioned, should be sufficient to reduce the oxygen-containing compound indirectly. Correlation of the two rates is based on the stoichiometry of the different compounds and/or elements involved.

In circumstances under which the oxygen-containing metal feed source 32 and the second reducing agent source 46 have well-characterized compositions, the two rates are easily arranged to have the appropriate stoichiometry for substantially complete final reduction of the oxygen-containing metal compositions.

Otherwise, it becomes necessary to determine at least the approximate amounts of the reactive components of the respective compositions. Reactive components are those that will undergo reaction in the bath. The determination of the effective concentrations of the reactive components may be made by direct or indirect analytical techniques, which are well known in the art. These techniques may be automatic, semi-automatic or manual, depending on the nature of the sources. Whenever possible, it is preferable to use automatic techniques involving steps of gathering compositional data from the two sources, processing them through a computer and then leading them to conventional servomechanisms for regulating the desired rates in order to achieve the appropriate stoichiometry.

Monitoring of the molten bath compositional changes, as well as the compositions of the slag and off-gas, are also important. These analytical measurements may give indirect information regarding the relation of the feed source and the reducing-agent source. If, for example, the amount of the second metal oxide (FeO for example) in the bath becomes excessive, the rate of the second reducing agent will have to be decreased. In a similar manner, if the concentration of the second reducing agent (carbon or carbonaceous materials for example) in the bath has increased considerably, then either the rate of injection of the second reducing agent will have to be decreased, or the rate of introduction of the feed source into the bath will have to be increased. The concentration of the second metal oxide is considered to be excessive if it exceeds its solubility limits in the metal bath, and starts migrating to the vitreous layer. Similarly, the concentration of the reducing agent, carbon for example, should be monitored such that its concentration does not exceed its solubility in the bath. Thus, it is very important to remain within the solubility limits of these reactants in the bath, and operate as close as possible to the desired stoichiometric ratio for optimization of the reaction and minimization of off-gas emissions.

It is evident that during this process, the concentrations of the second metal oxide and the second reducing agent do not have to reach excessive values for corrective action to be taken. On the contrary, it is highly desirable to correct the deviations from the optimum stoichiometry as soon as they are detected, and in a manner, which is as continuous as possible. Changes in material balance may be made from different inlets, depending on what corrective action is desired to be taken. As an example, such inlets include, but are not limited to feed inlet 18, conduit 33, feed tuyere 22, reducing agent tuyere 36, and the like.

In cases wherein an oxidizable carbonaceous fraction of the metal-containing composition exceeds the labile oxygen in the waste composition, an oxidizing agent, such as oxygen or an oxygen-containing compound, can be directed into molten bath 94. When carbon is desired as the second reducing agent, the carbonaceous fraction can be coal, coke or the like, or it can be introduced in the form of carbonaceous waste materials. The oxidizing agent oxidizes at least a portion of the atomic constituents formed during thermal decomposition of components of the metal-containing composition, according to the method of the invention. The oxidizing agent can be directed into molten bath 94 by a suitable means, such as through a tuyere, not shown, disposed at lower portion 16 of reactor 12 at a point remote from feed tuyere 22 and reducing agent tuyere 36.

Emission spectroscopy is a highly effective analytical method for determining metal concentrations in the different inlets, mainly when the feed is in the form of liquid solution, dispersion, aerosol, fluidized powder, and the like.

Real time analysis is possible because a sample may be taken in short time intervals, or even continuously, and analyzed almost instantaneously. Use of Inductively Coupled Plasma techniques in Flow Injection Analysis are of particular interest, since they provide high elemental coverage (at least 70 elements), low detection limits (0.1 to 100 ng/mL), simultaneous multi-element capability, good precision (0.5-2% RSD), and broad dynamic range (4-6 orders of magnitude). Details on such analytical techniques are given in "Inductively Coupled Plasma Emission Spectroscopy", Edited by P. W. J. M. Boumans, published by John Wiley & Sons, New York.

In more detail, application of the method described depends on maintaining a dynamic equilibrium between the metal oxide feed and reducing agents. The present invention addresses this issue by integrating specific control mechanisms for guaranteeing necessary process conditions, even when systematically changing the throughput and composition of the metal oxide feed.

The scope of this invention covers the use of any control mechanism for maintaining dynamic equilibrium which measures, either directly or indirectly, the accumulation of the metal oxide feed and/or the reducing agents within the vessel. Such measurements can be used in a feedback manner for manipulating either the flow of the metal oxide or the secondary reducing agent into the reactor, although this example is not meant to restrict other mechanisms integrating these measurements. For example, other measurements could also be used within feed forward or cascade control configurations. Typically, implementation is done by computer control, though it is not restricted to this method.

There are numerous methods for measuring the accumulation of the metal oxide and/or reducing agents in the bath. One could measure these directly using a sampling device, such as a Minco sampler, coupled with an optical emission spectroscope (OES) and inductively coupled plasma (ICP) device. Alternatively, novel techniques involving laser-based measurement could be used. Indirect measurement may be accomplished by measuring gas phase compounds with continuous emission monitoring (CEM) in conjunction with a mathematical model of the process to quantify the accumulation in the bath. Any such methods could be used within the context of this discussion.

The implementation of such process control can be made clearer by use of an example. The use of this example, however, in no way precludes other control implementations using the above mentioned measurements. In this example, it is assumed that nickel oxide is the metal oxide and is fed only from metal feed source 32. Iron is the first reducing agent, carbon is the second reducing agent, and the flow of nickel oxide into the bath is governed by other factors (e.g. set at a fixed rate, set by another control loop, etc.). Referring to the Figure, the nickel oxide content of the stream directed from metal feed source 32 is measured using X-ray fluorescence spectrometer 100, and the rate of flow of the stream is measured with flow meter 111. These measurements are fed into control block 112 which manipulates, in a feed forward manner, the flow rate of carbon in stream 46 to maintain it at a desired ratio with respect to the rate of nickel oxide addition in waste stream 32. Manipulation is achieved by using valve 102 to adjust the flow.

This feedforward loop responds quickly to changes in the nickel oxide feed rate and can maintain optimal carbon feed rates for a short time, but is inadequate for maintaining necessary operating conditions over long durations. To achieve long term operation at desired conditions, the bath is sampled using Minco sampler 104 in sampling lance 106 to obtain samples. Iron oxide content is measured using OES and ICP 108. This measurement is fed into a computer control block 110 which, when FeO concentrations are at unacceptable levels, adjusts the ratio setpoint parameter of control block 112 to maintain long term operation at desired conditions. The implementation of control blocks 110 and 112 are based on dynamic models of the process, and can be accomplished by those skilled in the art.

Off-gas formed in the reaction zone can include at least one of the reaction products formed by chemically reducing the second metal oxide with the second reducing agent. For example, reaction of a second metal oxide with carbon, as the second reducing agent, can cause formation of carbon monoxide gas. The carbon monoxide gas is released from molten bath 94 into gas layer 98 and becomes a component of the off-gas. Other components of off-gas formed in reactor 12 can include hydrogen gas, water, etc. formed by chemical transformation of other components of the metal-containing composition, such as organic compounds.

Off-gas formed in reactor 12 is conducted from the reaction zone through off-gas outlet 20 to heat exchanger 60. The off-gas is cooled in heat exchanger 60 by conducting the off-gas through off-gas side 62 of heat-exchanger 60 and by directing a suitable cooling medium through a coolant side 68 of heat exchanger 60. The off-gas is conducted into heat exchanger 60 through off-gas inlet 64 and then through off-gas outlet 66. The coolant is directed from coolant source 76 through coolant inlet 70 of heat exchanger 60 by a suitable means, such as by use of a pump, not shown. The coolant is directed through the coolant side 68 of heat exchanger 60, thereby cooling the off-gas, and is then directed out of heat exchanger 60 through coolant outlet 72. The coolant is conducted through heat exchanger 60 at a rate sufficient to cool the off-gas to a temperature suitable for subsequent formation of a liquid composition from the cooled off-gas. In one embodiment, the off-gas is cooled to a temperature below about 500° C.

The off-gas is directed out of off-gas outlet 66 to scrubber 78 in order to expose the off-gas to conditions sufficient to remove at least one component from the off-gas for further processing, such as return to reactor 12 or for treatment in an additional reactor, not shown. Examples of methods for treatment of the off-gas, including separation and processing of components of the off-gas, are disclosed in U.S. patent application Ser. No. 07/737,048, the teachings of which are included herein by reference. In those cases where the off-gases contain volatile readily reducible metals such as zinc, mercury and cadmium, the gases can be directed to a condenser and recovered by condensation. The gaseous metal vapors can be condensed and the liquid metal and alloys can be tapped in a suitable manner, such as by scrubbing. Optionally, material that accumulates at the condenser can be recycled to the reaction zone. The non-volatile metals can be tapped as an alloy or ferrous alloy from the iron bath. Also, carbon monoxide can be a recoverable product of the method.

Metal recovery of non-volatile metals may be particularly advantageous in this invention where the principal metal of the feed, the first metal oxide, is the same as the bath metal, thereby affording a bath enriched in a recoverable metal. For example, molten copper can be employed as the bath metal for recovery of copper metal from waste streams highly enriched in the oxides of copper. In those cases where the free energy of formation of the oxide of the bath metal is higher than that of a metal contaminant present in the feed, it may be advantageous to use a sacrificial metal with a highly negative free energy of oxidation, relative to the first metal oxide.

The following are illustrations of various applications of the method of the invention to chemically reduce a metal oxide of a metal-containing composition.

ILLUSTRATION I

A metal-containing spent catalyst includes iron(III)oxide ($Fe_1O_3$) and molybdenum(IV) oxide ($MoO_2$) as first metal oxides. Molten bath 94 includes iron as a first reducing agent. The metal-containing composition is directed from feed source 32 through feed inlet tube 26 of feed tuyere 22 into molten bath 94. Essentially all of the iron oxide and molybdenum oxide are chemically reduced by the first reducing agent, iron, in molten bath 94. The incipient metal oxide (FeO) dissolves upon contact with the bath metal to form the solvated second metal oxide, iron(II)oxide (FeO). The dissolution of essentially all the second metal oxide in molten bath 94 ensures facile reduction of the contaminant oxide to its pure metallic state. The dissolved iron(II)oxide migrates through molten bath 94 from a portion of molten bath 94 proximate to feed tuyere 22 to a portion of molten bath 94 which is proximate to reducing agent tuyere 36.

Carbon is employed as a second reducing agent. The carbon is directed from reducing agent source 46 through conduit and reducing agent tuyere 36 into molten bath 94. The rate of introduction of the carbon, relative to the combined rate of introduction of iron(III)oxide and molybdenum(IV) oxide, is sufficient to chemically reduce the iron(II)oxide at a rate which allows the deliberate solubilization of essentially all iron(II)oxide, subsequently formed during introduction of additional metal-containing composition into molten bath 94 for chemical reduction. The dissolved iron(II)oxide is chemically reduced by the carbon and enriches the bath in iron, and the molybdenum metal remains dissolved in the bath. The overall process constitutes a reductive-extraction of insoluble metal oxides and dissolution of their corresponding metals in the bath.

ILLUSTRATION II

A waste-treatment sludge is treated as a metal-containing composition that includes EPA designated toxic metals as first metal oxides. The toxic waste contains the normal valent oxides of cadmium (Cd), cobalt (Co), chromium (Cr), copper (Cu), iron (Fe), potassium (K), molybdenum (Mo), sodium (Na), nickel (Ni), lead (Pb), sulfur (S), tin (Sn), tungsten (W) and zinc (Zn). Molten bath 94 includes manganese (Mn) as the first reducing agent.

The metal-containing composition is directed into molten bath 94 through feed tuyere 22. Essentially all of the first metal oxides are chemically reduced by the manganese to form a second metal oxide, manganese oxide (MnO). Essentially all of the manganese oxide dissolves in molten bath 94. The manganese oxide migrates from a portion of molten bath 94 proximate to feed tuyere 22 to a portion of molten bath 94 proximate to reducing agent tuyere 36.

Carbon, as the second reducing agent, is directed into molten iron bath 94 through reducing agent tuyere 36. Boron, silicon or titanium can also serve as the second reducing agent. The rate of introduction of carbon, relative to the combined rate of introduction of first metal oxides, is moderated to allow the carbon to chemically reduce the manganese oxide intermediate in its dissolved state at a rate which assures that essentially all subsequently formed manganese oxide remains dissolved in molten bath 94. Reduction of the dissolved manganese oxide by carbon returns the manganese to its pure elemental form and produces carbon monoxide as an offgas.

The stoichiometry of manganese is comparable to or exceeds the equilibrium concentration of the first metal oxide and the concentration of carbon is comparable to or greater than the equilibrium concentration of the second metal oxide. The effective concentration of Mn and its exceptionally low Gibbs free energy of oxidation ensures that essentially all of the waste metal oxides are rapidly stripped of their oxygen atoms, by oxygen atom transfer to Mn, upon entering the bath.

ILLUSTRATION III

The metal-containing composition, comprised of nickel compounds containing various ligands (L), and containing nickel metal, nickel alkyls, oxygen-containing nickel organometallic complexes and nickel oxide as $M^1O_xL_n$, and including either a single metal oxide, such as uranium oxide, or a variety of metal oxides having free. energies of oxidation lower than that of carbon, are placed in equilibrium in a substantially homogeneous iron bath. The introduction of first metal oxides, contained in the metal-containing composition, are chemically reduced by the iron, forming a second metal oxide, iron oxide (FeO), and affording inclusion of the metals comprising the first metal oxides, into the molten iron bath. Essentially all of the iron oxide dissolves in molten bath 94. The iron oxide migrates from a portion of molten bath 94 proximate to feed tuyere 22 to a portion of molten bath 94 proximate to reducing agent tuyere 36. Carbon, as the second reducing agent, is directed into molten iron bath 94 through reducing agent tuyere 36. The rate of introduction of carbon, relative to the combined rate of introduction of the first metal oxides, is moderated to allow the carbon to chemically reduce the iron oxide intermediate in its dissolved state at a rate which assures that essentially all subsequently formed iron oxide remains dissolved in the molten bath 94. Reduction of the dissolved iron oxide by carbon returns the iron to its elemental form and produces carbon monoxide as an off-gas. Processing of the metal-containing composition continues to dissolve the metals of the first metal oxide into the liquid iron phase and accumulates those metal oxides which are not reducible by carbon into the vitreous phase.

Upon concentration of the unreduced metal oxides, such as uranium oxide, into the vitreous phase, the feeding of the metal-containing composition into molten bath 94 is suspended and a third reducing agent, having a free energy of oxidation which is lower than the free energy of oxidation of the remediable metal oxides concentrating in the vitreous phase, is injected into molten bath 94. Introduction of the third reducing agent, subsequent to the introduction of the second reducing agent, selectively reduces metal oxides accumulating in the vitreous phase. Examples of suitable third reducing agents include magnesium, aluminum, calcium and zirconium.

ILLUSTRATION IV

A finely-ground spent refractory brick containing chromium oxide ($Cr_2O_3$) and highly toxic chromium(VI)oxide ($CrO_3$) as first metal oxides and as recoverable contaminants within a vitreous residue is either disposed in a molten iron bath or preferably injected (through tuyere 22) into the bath. Iron, as the first reducing agent, in the molten iron bath reacts with the oxides of chromium on the surface of a dispersed vitreous particle or at the interface between the vitreous phase and the iron bath phase to form iron(II)oxide, as the second metal oxide, and elemental chromium. Upon successive oxygen atom transfer steps both the iron(II)oxide (FeO) and the chromium dissolve in the molten iron bath. Carbon, as the second reducing agent, is directed into the molten iron bath to react with the iron oxide and thereby form carbon monoxide gas and regenerate elemental iron. The chromium oxides are thus detoxified and the metal is recovered as a ferrochrome alloy.

ILLUSTRATION V

A municipal sludge containing heavy metals and their oxides as contaminants (e.g., CdO, HgO, ZnO) is directed into molten iron bath 94 through feed tuyere 22. The combined metal oxides are all readily reduced to their metallic state by the bath metal iron and accrues therein for recovery. All volatile metals pass through the vitreous layer and exit molten bath 94 to be recovered by condensation of the metal vapors by off-gas treatment. The oxygen portion of metal. oxide is converted to carbon monoxide via the intermediacy of iron(II)oxide. The carbon source is derived principally from carbonaceous materials in the sludge. Non-volatile metals are reduced and accrue to either the metal or vitreous layer depending upon their Gibbs free energies of oxidation.

ILLUSTRATION VI

A finely divided residue from the calcination of spent platinum catalysts is introduced by tuyere injection into a molten iron bath. The contaminated platinum oxide is reduced by the iron and the high boiling platinum metal accrues to the iron bath. The transient Feo is returned to its metallic state upon reduction by a carbon source derived from hydrocarbon gas introduced by injection as a shroud gas through tuyere or tube 24. Carbon monoxide and hydrogen exit the reactor. The platinum metal remains in the iron bath in its dissolved state and may be recovered and purified in a known manner.

EQUIVALENTS

Those skilled in the art will recognize, or be able to ascertain using no more than routine experimentation, many equivalents of the invention described specifically herein. Such equivalents are intended to be encompassed in the scope of the following claims.

We claim

1. A method for the indirect chemical reduction of an oxygen-containing metal compound of a metal-containing waste composition, comprising the steps of:
    a) directing the metal-containing waste composition into a molten bath, including a first reducing agent which, under the operating conditions of the molten bath, chemically reduces the oxygen-containing metal compound in the metal-containing composition to form a metal oxide; and
    b) directing a second reducing agent into the molten bath, the second reducing agent, under the operating conditions of the molten bath, chemically reducing the metal oxide, and being directed into the molten bath at a rate, relative to the rate at which the metal of the oxygen-containing metal compound is directed into the molten bath, sufficient to cause essentially all subsequently formed metal oxide to dissolve in the molten bath, thereby indirectly chemically reducing the oxygen-containing metal compound of the metal-containing composition.

2. A method of claim 1 wherein the oxygen-containing metal compound of the metal-containing waste composition includes a metal oxide.

3. A method of claim 1 wherein the oxygen-containing metal compound of the metal-containing waste composition includes a metal hydroxide.

4. A method of claim 1 wherein the oxygen-containing metal compound of the metal-containing waste composition includes a metal oxyhalide.

5. A method of claim 1 wherein the oxygen-containing compound of the metal-containing waste composition includes a metal alkoxide.

6. A method of claim 1 wherein the oxygen-containing metal compound includes at least one ligand.

7. A method of claim 1 wherein the metal of the oxygen-containing metal compound is a precious metal.

8. A method of claim 7 wherein the precious metal is selected from the group consisting essentially of titanium, vanadium, niobium, chromium, cobalt, nickel, silver and platinum.

9. A method of claim 1 wherein the metal of the oxygen-containing metal compound is a heavy metal.

10. A method of claim 9 wherein the heavy metal is selected from the group consisting essentially of lead, mercury, cadmium, zinc, tin, and arsenic.

11. A method of claim 1 wherein the metal of the oxygen-containing metal compound is iron or copper.

12. A method of claim 11 wherein the oxygen-containing metal compound of the metal-containing waste composition comprises a metal oxychloride.

13. A method of claim 1 wherein the second reducing agent is a metal.

14. A method of claim 13 wherein the metal is selected from the group consisting of aluminum, magnesium, calcium, silicon, and mixtures thereof.

15. A method of claim 1 wherein the oxygen-containing metal compound of the metal-containing composition is a first metal oxide and wherein the metal oxide formed by reaction of the first reducing agent with the first metal oxide is a second metal oxide.

16. A method of claim 15 wherein the first reducing agent has a lower Gibbs free energy of oxidation than the metal component of the first metal oxide, and wherein the oxide of the second reducing agent has a lower Gibbs free energy than that of the first reducing agent.

17. A method of claim 16 wherein the second reducing agent is directed into the molten bath at a location which is sufficiently remote from a point of introduction of the metal-containing composition to allow essentially all of the first metal oxide which is directed into the reactor to be reduced by the first reducing agent in the molten bath prior to reduction by the second reducing agent.

18. A method of claim 17 wherein the stoichiometric ratio of the first reducing agent to the oxygen-containing metal compound is greater than about 1:1 and the stoichiometric ratio of the second reducing agent to the second metal oxide is greater than about 1:1.

19. A method of claim 18 wherein the metal-containing composition includes more than one oxygen-containing metal compound which can be reduced by the first reducing agent in the molten bath.

20. A method of claim 19 wherein a metal component which comprises a substantial portion of the molten bath is also a metal component of the first metal oxide.

21. A method of claim 19 wherein the first reducing agent includes a metal in its elemental state.

22. A method of claim 21 further including the step of dissociating an organic component of the metal-containing composition, to its respective elements.

23. A method of claim 21 further including the step of directing an oxidizing agent into the molten bath.

24. A method of claim 21 wherein the oxidizing agent is selected from the group consisting essentially of the oxides of Cu, Ni, Mo, Pt, Pd, Rh, Ru and V.

25. A method of claim 24 wherein the second reducing agent includes carbon.

26. A method of claim 25 further including the steps of volatilizing the metal of the first metal oxide and then recovering the metal.

27. A method of claim 26 wherein the oxygen-containing metal compound is a contaminant in a sludge.

28. A method of claim 26 wherein the oxygen-containing metal compound is a contaminant in an ash.

29. A method of claim 26 wherein the oxygen-containing metal compound is a contaminant in a dust.

30. A method of claim 26 wherein the oxygen-containing metal compound is a contaminant in a soil.

31. A method of claim 1 further including the step of directing a sacrificial metal into the molten bath after the second reducing agent has reduced at least a Significant portion of the second metal oxide, the sacrificial metal being soluble in the metal bath and having a lower free energy of oxidation than the second reducing agent, whereby the sacrificial reacts with a third metal oxide of the waste composition which is substantially inert to the first and second reducing agents at the temperature of the molten bath.

32. A method for the indirect chemical reduction of at least two oxygen-containing metal compounds of a metal-containing waste composition, comprising the steps of:

a) directing the metal-containing waste composition into a molten bath, including a first reducing agent which, under the operating conditions of the molten bath, chemically reduces a first oxygen-containing metal compound of the metal-containing composition to form a metal oxide; and b) directing a second reducing agent into the molten bath, the second reducing agent, under the operating conditions of the molten bath, chemically reducing the metal oxide, and being directed into the molten bath at a rate, relative to the rate at which the metal of the oxygen-containing metal compound is directed into the subsequently formed metal oxide to dissolve in the molten bath, thereby indirectly chemically reducing the first oxygen-containing metal compound of the metal-containing composition; and thereafter c) directing a sacrificial metal into the molten bath after the second reducing agent has reduced at least a significant portion of the second metal oxide, the sacrificial metal being substantially soluble in the metal bath and having a lower free energy of oxidation than the second reducing agent, whereby the sacrificial reacts with a second oxygen-containing metal compound of the waste composition, the second oxygen-containing metal compound being substantially inert to the first and second reducing agents at the temperature of the molten bath, thereby chemically reducing the second oxygen-containing metal compound of the waste composition.

33. A method of claim 32, wherein the molten bath includes nickel, vanadium, chromium, and iron, and the waste composition includes at least one of a nickel metal, a nickel oxide at any nickel valence state, a nickel alkyl, and an oxygen-containing nickel organic complex.

34. A method of claim 32 wherein the molten bath includes iron and the waste composition comprises at least one of a nickel metal, a nickel oxide at any nickel valence state, a nickel alkyl, and an oxygen-containing nickel organic complex.

35. A method of claim 32 wherein the molten bath includes at least one radioactive metal.

36. A method of claim 32 wherein the waste composition includes at least one of a nickel metal, a nickel oxide at any nickel valence state, a nickel alkyl, and an oxygen-containing nickel organic complex.

37. A method of claim 35 wherein the radioactive metal is selected from the actinides group.

38. A method of claim 32 wherein the sacrificial metal is introduced in the molten bath at such an amount and rate as to combine with substantially all of the oxygen of the second oxygen-containing metal compound.

39. A method for indirect chemical reduction of an oxygen-containing metal compound, comprising the steps of:
a) directing the oxygen-containing metal compound into a molten bath, whereby an oxygen-containing metal compound phase is formed in the presence of a molten bath phase, wherein the two phases are substantially immiscible, the molten bath including a first reducing agent which, at the operating conditions of the molten bath, chemically reduces a significant portion of the oxygen-containing metal compound to form a metal oxide and a reduced metal of oxygen-containing metal compound at a surface of the molten bath phase which is in contact with the oxygen-containing metal compound phase, and wherein both the metal oxide and the reduced metal substantially dissolve in the molten bath; and
b) directing a second reducing agent into the molten bath to chemically reduce the metal oxide at a rate comparable to that of the dissolution of the reduced metal of the metal oxide into the molten bath.

40. A method for chemically remediating a oxygen-containing metal contaminant of a metal-containing composition, comprising the steps of:
a) directing the metal-containing composition into a molten bath which includes a first reducing agent that, under the operating conditions of the molten bath, chemically reduces the oxygen-containing metal contaminant of the metal-containing composition to form a metal oxide and a reduced metal component of the metal-containing metal composition;
b) directing a second reducing agent into the molten bath which, under the operating conditions of the molten bath, reduces the metal oxide, and at a rate, relative to the rate at which the metal-containing composition is directed into the molten bath, which is sufficient to cause essentially all subsequently formed metal oxide to dissolve in the molten bath; and thereafter
c) reclaiming the reduced metal component of the metal-containing composition from the molten bath.

* * * * *